Oct. 15, 1940.  D. G. MAGILL  2,218,116
METHOD OF PRODUCING MOISTUREPROOF FIBER CONTAINERS
Filed Oct. 5, 1939  2 Sheets-Sheet 1
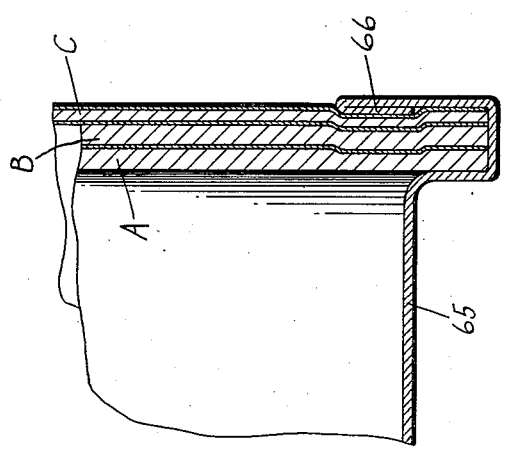
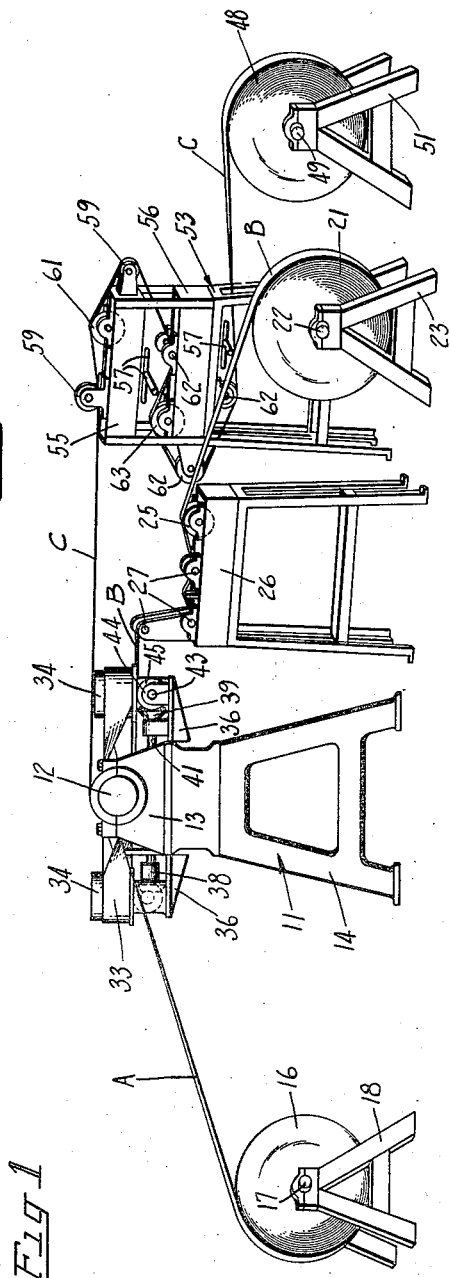
INVENTOR
Donald G. Magill
BY
ATTORNEYS

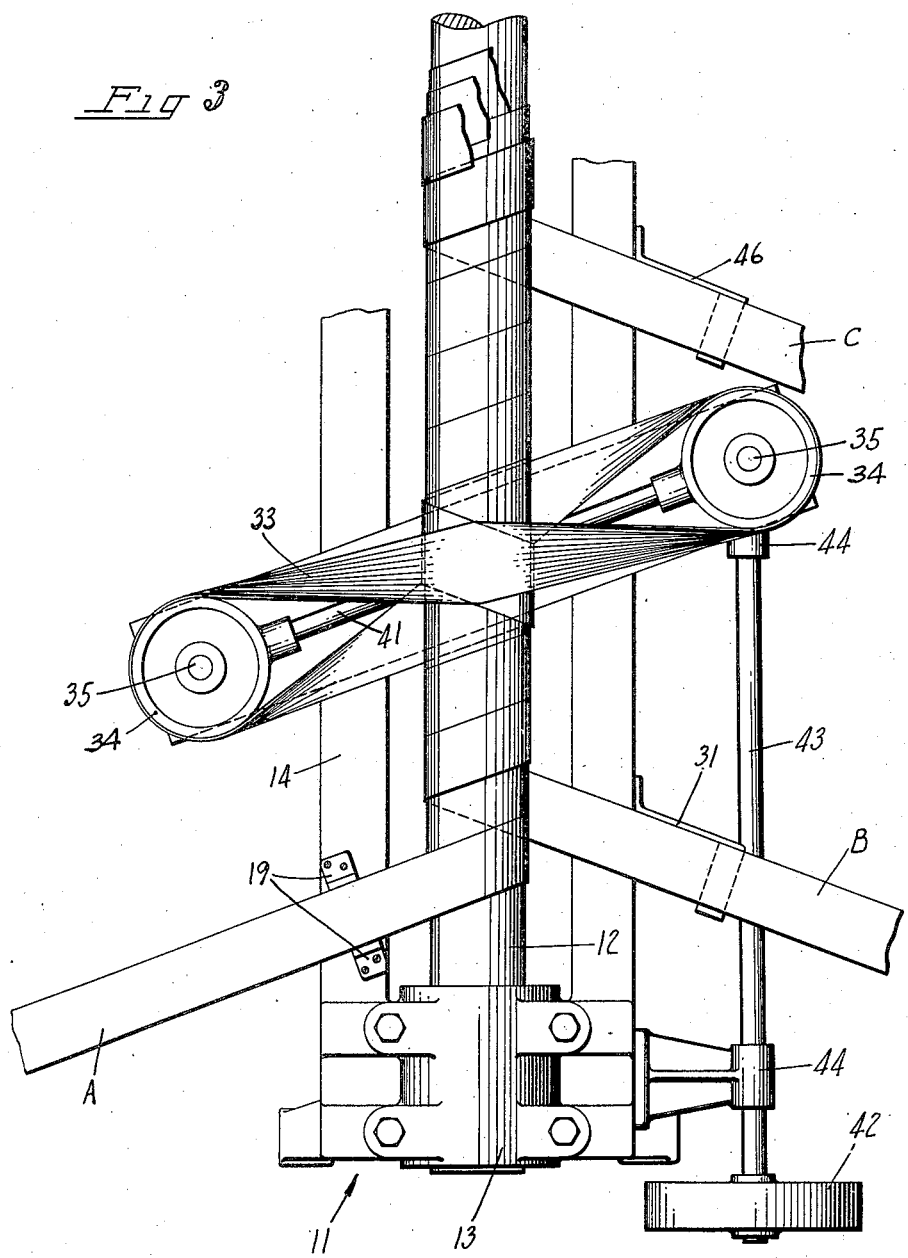

Patented Oct. 15, 1940

2,218,116

UNITED STATES PATENT OFFICE 2,218,116

METHOD OF PRODUCING MOISTUREPROOF FIBER CONTAINERS

Donald G. Magill, Great Neck, N. Y., assignor to American Can Company, New York, N. Y., a corporation of New Jersey Application October 5, 1939, Serial No. 298,144

3 Claims. (Cl. 93—94)

The present invention relates to a method of producing moistureproof fiber containers or cans and has particular reference to treating and applying a moistureproof layer or layers or ply for the finished container. This invention is a continuation in part of my pending application Serial Number 175,129, filed in the United States Patent Office November 17, 1937, on Method of producing moistureproof fiber containers.

By reason of the difficulty of obtaining moistureproof fiber packages, many materials of a deliquescent nature such as malted milk, malt sugars and the like have heretofore been packed in glass and other expensive containers. Attempts have been made to produce moistureproof fiber containers by placing a film or films of asphalt or other moisture resisting coatings between the plies of paper board comprising the body walls of such containers. A weakness in this construction is that moisture is liable to gain a foothold in the body wall exterior to the asphalt film and when a foothold is gained there is considerable danger that the moisture which is thus retained as in a reservoir will eventually pass through the asphalt film into the interior or through the top and bottom seams.

Another common expedient employed in the manufacture of fiber containers, in an endeavor to render the container moistureproof, is the wrapping of the container in a moistureproof paper. Again a moistureproof lacquered label is often used under the false impression that this will make the container moistureproof. A weakness of such constructions, aside from the fact that it is very expensive, is that moisture from the exterior usually is able to penetrate through the folds.

The present invention contemplates a method of making an inexpensive fiber container which overcomes these difficulties by preventing moisture from gaining an initial foothold in the body wall. For all practical purposes containers formed according to the steps of the invention completely prevent passage of moisture through the body wall. A package of such high degree moistureproofing qualities is particularly desirable for containing commodities which are particularly susceptible to moisture.

An object, therefore, of the present invention is the provision of a method of producing moistureproof fiber containers wherein the container body is made moistureproof by the application of a thin carrier sheet of parchment, glassine, or other grease-proof special paper or sheet which has been hydrated, such grease-proof sheet also being coated on one side with a continuous film of amorphous material which is adhesive as well as moistureproof and on the other side with moistureproof waxes or lacquers which make a continuous film on the paper and which are preserved in continuity by the imperviousness of the hydrated sheet, the combination of the amorphous material and the continuous dense film of wax or lacquer on the impervious sheet providing an impenetrable protective coating against moisture for the container contents.

Numerous other objects and advantages of the invention will be apparent as it is better understood from the following description, which, taken in connection with the accompanying drawings, discloses a preferred embodiment thereof.

Referring to the drawings:

Figure 1 is a perspective view of one form of apparatus for carrying out the various steps of the instant method invention;

Fig. 2 is an enlarged sectional detail of a portion of a container manufactured in accordance with the steps of the method invention; and Fig. 3 is an enlarged fragmentary plan view of a portion of the apparatus illustrated in Fig. 1.

In accordance with the instant method invention a continuous moistureproof tube preferably spirally wound is produced from which can bodies may be cut off at any desired length. The tube and the resulting can body are preferably of three ply thickness and are made from three separate strips or webs, two of fibrous material and the outer one of hydrated, cellulosic grease-proof material. These strips are indicated in the drawings by the letters A, B and C. Strips A and B may be any suitable can body fiber stock and when wound into the tube constitute, respectively, an inner and an intermediate ply of the finished tube.

Strip C is a carrier strip and is preferably a thin parchment, glassine or other grease-proof or hydrated sheet which has been coated on its two surfaces with different moistureproofing materials, as will be more fully described. As used in the present description, the term "hydrated" in connection with a strip or sheet refers to the process of introducing moisture into the cellulose molecules of cellulosic material thus rendering the same grease-proof and non-absorbing or non-wicking as to coating materials subsequently applied to its surfaces. There is thus a marked absence of piercing or breaking of the coating film by fibers of the strip or sheet, thus preserving film continuity. This carrier strip C constitutes the outer or third ply of the can body.

Strip A is first spirally wound into tube shape with the adjacent edges of the strip abutting. Strip B is coated on its inner surface with a suitable adhesive and is wound around the tube so far formed in a spiral fashion with its adjacent edges abutting and overlapping the edges of the strip A, the adhesive providing a suitable bond between the strips so applied.

Before the carrier strip C is applied to the can body tube it is coated on its inner surface with a molten amorphous material which is adhesive in character and on its outer surface with a suitable wax or moistureproof lacquer. Neither the amorphous material nor the outer coating penetrates into the hydrated grease-proofed sheet, as has already been pointed out. The coated carrier strip C is then wound on the body tube in a spiral direction parallel to that of strip B and with its adjacent edges overlapping, the strip C being drawn taut while winding. This taut winding brings the outer ply of the tube into tight fitting engagement with the intermediate ply and provides for sealing down the overlapping edges of the strip C, the amorphous material still being molten and plastic so as to effect a moisture-tight joint.

This sheet C has been referred to as a carrier sheet since it serves to carry and preserve the continuity of the liquid or molten film of the moistureproof amorphous adhesive material on the one side and the moistureproof waxes or lacquers on the other. This amorphous adhesive material may be one of several available microcrystalline or amorphous waxes which result from the distillation of mineral oils and having melting points in the range of from 115° F. to 165° F. and are known by the broad term cerese waxes.

Various asphalts may also be used because of their amorphous and adhesive nature. An important desirable feature of these amorphous materials is the absence of definite crystalline structure which produces highly moisture-resistance films when applied as in this invention. Such a film retains its continuity on the hydrated grease-proof sheet or strip during application of the molten film and after it has fully set.

An advantage of real importance in the use of continuous moisture-resistance films in the manner described is the fact that the overlapped edges of the carrier sheet cause not only the inner amorphous coating but also the outer wax or lacquer coating to unite at the spiral seam and to produce a moistureproof joint in a region heretofore very difficult to seal.

The outer coating of wax or lacquer may be of the same characteristics or of a different amorphous material or may consist of blends of amorphous and other materials.

Containers made from such body stock and thus moistureproofed have been packed with products highly susceptible to moisture such as powdered malted milk, malt sugars, etc., and have been subjected to tests in humid atmospheres of about 95 percent relative humidity over extended periods of time and have been transported on trucks for several weeks from place to place, unloaded and reloaded again, under all kinds of weather conditions during which time the containers have been directly and repeatedly subjected to moisture and yet when opened the contents of these containers showed that they were unaffected by any moisture and in perfect condition.

By way of illustrating a preferred form of apparatus for carrying out the steps of the instant method invention the drawings disclose the principal parts of a spiral tube winding machine generally indicated by the numeral 11 (Figs. 1 and 3). The winding machine includes a stationary cylindrical mandrel 12 one end of which is clamped in a block 13 carried on a main frame 14 which supports the various parts of the machine. The other end of the mandrel is free.

The inner ply or strip A of fiber is fed from any suitable source of supply such as a roll 16 preferably supported on a bar 17 carried in a sub-frame 18 disposed adjacent the winding machine 11. The strip is directed onto the mandrel 12 of the winding machine at an angle which will bring adjacent edges of the wound strip into abutting engagement with each other as best shown in Fig. 3. Guides 19 bolted to the winding machine frame 14 guide the strip into place on the mandrel.

As the strip A is wound and advanced along the winding machine mandrel the intermediate ply or strip B of fiber is wound over the top of it. This is the usual practice in spiral tube manufacture. Like strip A, strip B may be fed from a roll 21 which is supported on a bar 22 carried in an auxiliary frame 23 disposed adjacent the winding machine 11 on the opposite side to that on which the sub-frame 18 is located.

Adhesive is applied to the inner surface of the strip B by a roller 25 which is rotatably carried in an adhesive pot 26 disposed between the auxiliary frame 23 and the winding machine 11. The roller 25 rotates in a bath of adhesive in the pot 26 and carries the adhesive up onto the strip B as the latter is fed from its roll 21. Other rollers 27 guide the strip in its travel over the adhesive pot.

The adhesive coated strip B while being wound on the tube on the mandrel 12 of the winding machine is guided at the proper angle so that its adjacent edges will abut each other. For this purpose a guide 31 is secured to the side of the winding machine frame 14.

Winding and advancing of the tube on the mandrel 12 is effected by an endless belt 33 which is obliquely trained around the mandrel as best shown in Fig. 2. The belt takes over a pair of pulleys 34 mounted on vertical shafts 35 carried in suitable bearings formed in brackets 36 secured to the winding machine frame 14. The pulleys are rotated in unison by gearing generally indicated by the numerals 38, 39 (Fig. 1), the driving gears being carried on a cross-shaft 41. Power is transmitted to the gearing by way of a pulley 42 carried on the outer end of a drive shaft 43 mounted in bearings 44 secured to the machine frame 14. The inner end of the drive shaft carries a bevel gear 45 which meshes with the gearing generally indicated by the numeral 39.

The impervious carrier strip C is preferably wound around the outside of the tube at a point beyond the winding belt and is directed toward the mandrel at an angle which will permit the adjacent edges of the strip to overlap each other. A guide 46 is secured to the machine frame 14 for this purpose. Like the strips A and B, strip C may be fed from a roll 48 carried on a bar 49 supported in a side frame 51 disposed adjacent the winding machine 11 and the auxiliary frame 23.

The amorphous moistureproof adhesive and the wax or lacquer are applied to the strip in a double deck applying device 53 which is located between the side frame 51 and the winding machine 11. This device includes an upper tank 55 which contains a bath of molten amorphous adhesive and a lower tank 56 which contains the wax or lacquer. The wax is also molten but when lacquers are used they are preferably applied cold. Suitable heating elements 57 are provided under each tank for keeping its contents hot. The upper tank 55 carries a pair of guide rollers 59 and an adhesive applying roller 61, the latter roller dipping into the hot adhesive. The lower tank carries a plurality of guide rollers 62 and also a wax or lacquer applying roller 63 which is partially immersed in the hot wax or cold lacquer contained in the tank.

It may be found desirable to utilize in the winding machine a carrier sheet or strip which already has its outer surface coated with the wax or lacquer. Where this condition obtains, obviously the coating step has been previously carried out as an independent operation.

The carrier strip C is shown in the drawings as receiving its coatings in the winding machine. In being advanced toward the mandrel 12 of the winding machine, it first passes over the guide rollers 62 and the wax or lacquer applying roller 63 and thereby picks up a coating of wax or lacquer on the surface of the strip which will be on the outside of the tube when the strip is wound thereon. Passing from the wax or lacquer tank the strip moves over the guide rollers 59 and the adhesive roller 61 and picks up a coating of the amorphous adhesive on the opposite surface of the strip. This latter surface will directly contact the outer surface of the strip B on the tube.

The carrier strip C thereafter passes onto the tube being wound while the amorphous coating is still plastic. The threading of the strip C over the various rollers associated with the applying device 53 assists in holding the strip taut and also holds the strip in tight engagement against the tube while the strip is being applied. This presses the amorphous adhesive into close binding association with the tube and firmly seals down the overlapping edges of the strip.

The moistureproof tubing resulting from the winding of separate and different types of strips of fiber may be cut into finished can bodies of any desired length in any approved manner. Metal or fiber ends 65 may be attached to the body as shown in Fig. 2 in any suitable manner as by a seam 66 thus completing the container. The material of the can ends 65 at the seams 66 is preferably embedded into the body in such a manner as to prevent breaking of the wax or lacquer coating on the outside of the body but still tightly enough to prevent moisture from seeping into the container through the joints thereby produced.

Where such moistureproofing provision is made at this part of the container by embedding the metal of the container end into the moistureproof outer coating, a greatly improved package results and its moistureproofing qualities greatly exceed any kind of joint which does not form a complete carrier against moisture.

To emphasize this feature, it may be further said that the tight seams at the ends of the finished can and the moistureproof outer layer on the body prevent any moisture from getting into the fibers of the can body and thus prevent these fibers from acting as reservoirs for storing up an accumulation of small degrees of moisture which might otherwise collectively adversely affect the contents of the can. It has been found that such a method of moistureproofing the outside area of containers thus prevents the building up of moisture in the can walls and is therefore much more effective as when applied to the inside of the container.

While a two-ply body stock and a single carrier sheet strip has been shown in this example of the invention, it will be obvious that where stronger body structure is desired more than two body strips will be used. Again a multiplicity of carrier strips and a plurality of coatings may be found desirable where the containers are subjected to rough handling or excessive abuse.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of producing moistureproof fiber containers which comprises winding a plurality of strips of fiber into a continuous tube bonded with adhesive, feeding a strip of hydrated greaseproof material toward said tube, the strip having a continuous non-impregnating film of wax on its outer surface and a continuous film of amorphous adhesive on its inner surface when the strip meets said tube, and applying said coated strip to said tube with its inner surface containing the amorphous adhesive in contact with said tube and sealed together by said amorphous adhesive for providing a bond between the engaged parts of the tube and strip.

2. A method of producing moistureproof fiber containers which comprises winding a plurality of strips of fiber into a continuous tube bonded with adhesive, feeding a strip of glassine toward said tube, superficially applying a non-impregnating coating of moistureproof lacquer to the outer surface of said material, superficially coating the inner surface of said material with amorphous adhesive, and applying said coated material to said tube with the amorphous adhesive coated surface in contact with said tube and with its edges overlapped and sealed together by said amorphous adhesive for providing a bond between the tube and the strip of glassine.

3. A method of producing moistureproof fiber containers which comprises winding a plurality of strips of fiber into a continuous tube bonded with adhesive, feeding a strip of parchment material toward said tube, superficially applying a non-impregnating coating of moistureproof waxlike substance to the outer surface of said material, superficially coating the inner surface of said material with asphalt adhesive, and applying said coated material to said tube with the asphalt adhesive coated surface in contact with said tube and with its edges overlapped and sealed together by said asphalt adhesive for providing a bond between the tube and the strip of parchment material.

DONALD G. MAGILL.